United States Patent
Denner et al.

(10) Patent No.: US 10,733,175 B2
(45) Date of Patent: *Aug. 4, 2020

(54) DATA WAREHOUSE MODEL VALIDATION

(71) Applicant: INTERNATIONAL BUSINESS MACHINES CORPORATION, Armonk, NY (US)

(72) Inventors: Gary Denner, Longwood (IE); Paul Kilroy, Dublin (IE); Michael J. Loughran, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 421 days.

This patent is subject to a terminal disclaimer.

(21) Appl. No.: 15/498,619

(22) Filed: Apr. 27, 2017

(65) Prior Publication Data

US 2017/0293667 A1    Oct. 12, 2017

Related U.S. Application Data

(63) Continuation of application No. 15/091,689, filed on Apr. 6, 2016, now Pat. No. 10,585,875.

(51) Int. Cl.
*G06F 16/23* (2019.01)
*G06F 16/21* (2019.01)
*G06F 16/25* (2019.01)

(52) U.S. Cl.
CPC ........ *G06F 16/2365* (2019.01); *G06F 16/212* (2019.01); *G06F 16/254* (2019.01)

(58) Field of Classification Search
CPC ... G06F 16/2365; G06F 16/254; G06F 16/212

USPC ........................................................ 707/602
See application file for complete search history.

(56) References Cited

U.S. PATENT DOCUMENTS

| | | | |
|---|---|---|---|
| 8,019,795 | B2 | 9/2011 | Anderson et al. |
| 8,386,419 | B2 | 2/2013 | Yalamanchilli |
| 8,725,754 | B2 | 5/2014 | Gopalakrishnan |
| 9,037,549 | B2 | 5/2015 | Sankaranarayanan et al. |
| 9,996,807 | B2 | 6/2018 | Miller et al. |

(Continued)

OTHER PUBLICATIONS

Real-Time Technology Solutions, Inc., "Data Warehouse Testing", QuerySurge™, © 2015, pp. 1-5.

(Continued)

*Primary Examiner* — Michael Pham
(74) *Attorney, Agent, or Firm* — Richard A. Wilhelm

(57) ABSTRACT

This invention relates to a system, method and computer program product for a data warehouse model validation system, said data warehouse model validation system having an ETL model and a corresponding data warehouse model, said data ETL system comprising: an element group locator for locating an element group across the ETL model and the data warehouse model, whereby the element group comprises ETL elements and related data warehouse elements; an inconsistency determiner for determining inconsistencies between the ETL elements and data warehouse elements, whereby one or more elements are missing from the data warehouse model or one or more elements in the data warehouse model do not correspond to expected elements or features of elements; and an inconsistency recorder for recording any located missing elements or unexpected elements from the located element group.

10 Claims, 11 Drawing Sheets

(56) References Cited

U.S. PATENT DOCUMENTS

| | | |
|---|---|---|
| 2003/0070142 A1 | 4/2003 | Drake et al. |
| 2011/0246415 A1* | 10/2011 | Li .......................... G06F 7/026 707/602 |
| 2012/0221510 A1 | 8/2012 | Li et al. |
| 2014/0244569 A1* | 8/2014 | Seto ..................... G06F 16/254 707/600 |
| 2014/0279830 A1 | 9/2014 | Majumdar et al. |
| 2015/0046389 A1 | 2/2015 | Dhayapule et al. |
| 2015/0178358 A1 | 6/2015 | Baessler |

OTHER PUBLICATIONS

Datagaps, the data testing company, "ETL Validator", © 2013, pp. 1-6.

IBM, "IBM Watson Explorer", printed on Mar. 16, 2016, pp. 1-3, http://www.ibm.com/smarterplanet/us/en/ibmwatson/explorer.html.

Corr et al., "Agile Data Warehouse Design", Collaborative Dimensional Modeling, from Whiteboard to Star Schema, First Edition printed: Nov. 2011, Revised: Jan. 2012, Introduction, pp. 1-10.

Pending U.S. Appl. No. 15/091,689, filed Apr. 6, 2016, entitled: "Data Warehouse Model Validation", pp. 1-40.

IBM: List of IBM Patents or Patent Applications Treated as Related (Appendix P), May 1, 2017, pp. 1-2.

\* cited by examiner

Data Warehouse Model Validater 200

Element Group Locator 202

Inconsistency Determiner 204

Inconsistency Recorder 206

Validator 208

Recommender 210

Fixing Engine 212

Prioritization Engine 214

Data Warehouse Model Validator Method 300

FIG. 2

Data Warehouse Model Validater
Method 300

Start

Locating an element group across the ETL model (including source system data models and ETL staging data models) and data warehouse model, whereby the element group comprises at least two ETL elements and optionally one or more data warehouse elements that have a mapping relationship (elements include data model elements, ETL staging instructions and operational data)　304

Determining inconsistencies between the ETL elements and data warehouse elements, whereby one or more elements are missing from the data warehouse model or one or more elements in the data warehouse model do not correspond to expected elements　306

Recording any located missing elements or features of elements or unexpected elements from the located element group　308

Data Warehouse Model Validater
Method 300

(A)

Validating the data warehouse model for the located element group to if there is no unexpected element in or no expected element missing from the element group. Optionally further comprising validating the data warehouse model for all the located element groups if there is no unexpected element in or no element missing from all the located element groups   310

Recommending an improvement to fix the missing elements or unexpected elements in the element group of the data warehouse model or ETL model if there are missing elements or unexpected elements in the element group   312

Effecting improvements the missing elements or features of elements or unexpected elements in the element group of the data warehouse model or ETL model if there are missing elements or unexpected elements in the element group   314

Data Warehouse Model Validater Method 300

Prioritizing recommendations and fixes in the case where two or more element groups are located and respective recommendations determined, based on the number of differences between the respective element groups. 316

DATA WAREHOUSE MODEL VALIDATION

BACKGROUND

The present invention relates to a method and apparatus for data warehouse model validation.

A data warehouse is a central repository of integrated data, typically formed from by an extract transform load (ETL) process acting on many source systems in use within an organization. Validating the design and completeness of a data warehouse model can be challenging for the following reasons: data is not always modelled consistently in different source systems and the data warehouse may need to accommodate many data sources of varying levels of quality and consistency. Source systems may not be formally modelled (for example unstructured sources and spreadsheets) and may have minimal constraints applied to the data; and for source systems that are formally modelled, the quality of design of the source system models may differ widely, this can be for many reasons including the skills & experience of the data modeler.

BRIEF SUMMARY

Additional aspects and/or advantages will be set forth in part in the description which follows and, in part, will be apparent from the description, or may be learned by practice of the invention.

In an aspect of the invention there is provided a method for a data warehouse model validation system, having an extract transform load (ETL) model and a corresponding data warehouse model. Locating an element group across the ETL model and the data warehouse model, wherein the element group includes ETL elements and related data warehouse elements. Determining inconsistencies between the ETL elements and the data warehouse elements, wherein one or more the ETL elements and/or related data warehouse elements are missing from the data warehouse model or one or more the ETL elements and/or related data warehouse elements in the data warehouse model do not correspond to expected the ETL elements and/or related data warehouse elements or features of the ETL elements and/or related data warehouse elements. Recording any located missing the ETL elements and/or related data warehouse elements or unexpected the ETL elements and/or related data warehouse elements from the located element group. In practice the element group comprises one or more ETL elements that have a mapping relationship with one or more data warehouse elements but in theory an inconsistency may still be detected when there are zero data warehouse elements.

In the embodiments mapped means any type of relationship between data whereby it is possible to determine an inconsistency between the related data. Metadata examples are used in the described embodiments whereby inconsistencies are determined in the metadata but other embodiments look for inconsistencies in operational data. An element can be metadata like a table and operational data like the values in the table.

The embodiments use metadata and operational data to validate both the design and completeness of the data warehouse model, and suggest improvements. Operational data is data in the database rather than any operating system data. The embodiments analyze operational data versus design metadata to find inconsistencies. The embodiments suggest improvements to the data warehouse model to normalize the data structures to reduce redundant data (from the sources including major operational sources of data such as a customer relation management system and logging data from device sources), thus eliminating the need for the data warehouse team to manually analyze the operational device data across a large range of devices. The embodiments analyze source system metadata and assign a quality rating to the source system, based on criteria like: primary and foreign key constraints, effective timestamps, and adherence to rules of normal form. The system suggests improvements to the data warehouse model (for example data types and referential constraints) to make it consistent with higher quality source systems and force more consistency in the data warehouse operational data.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 2 is a component diagram, in accordance with an embodiment of the present invention;

FIGS. 3A, 3B and 3C are flow diagrams of a main process, in accordance with an embodiment of the present invention.

DETAILED DESCRIPTION

Figure 1A:
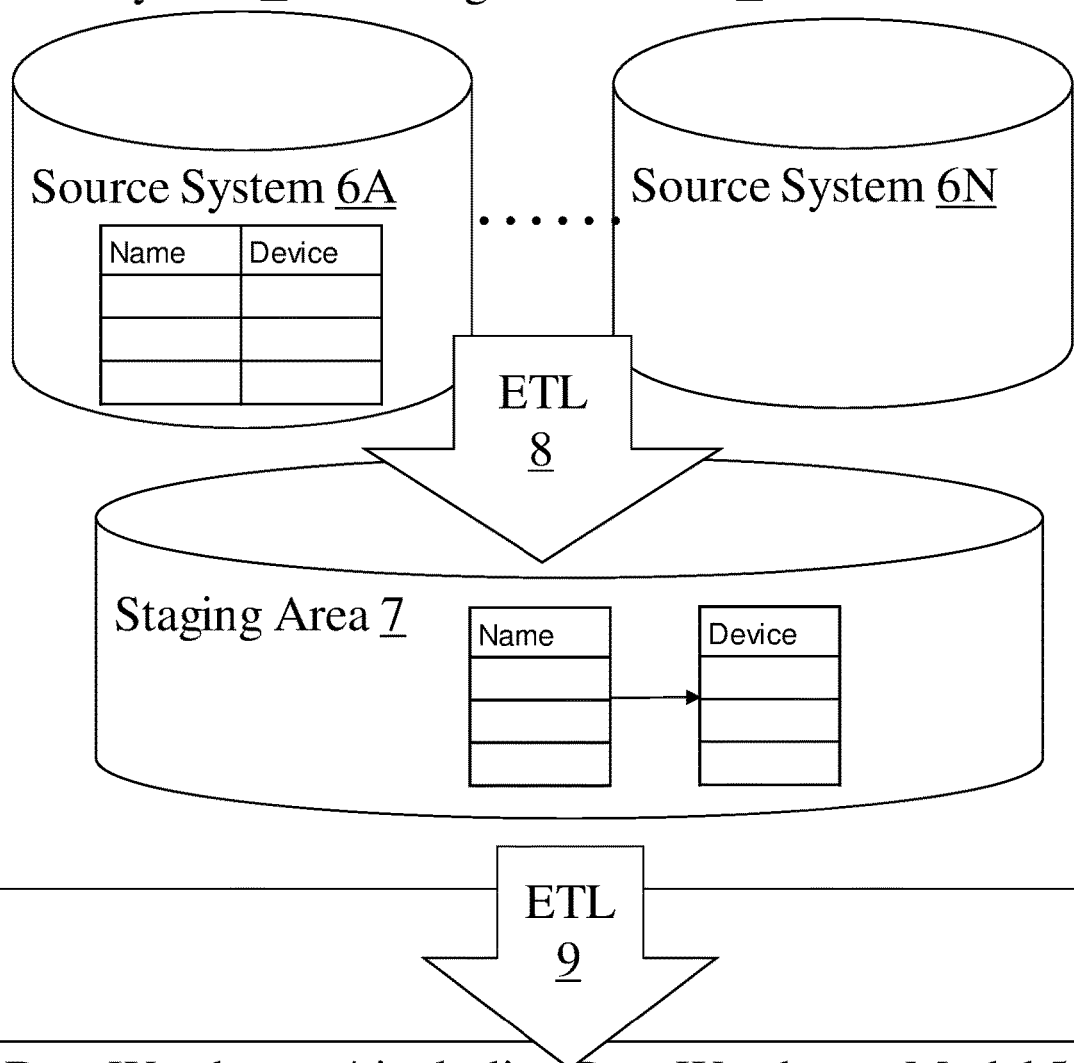
FIG. 1A is a component diagram of components in an example data warehouse system.
Figure 1A:
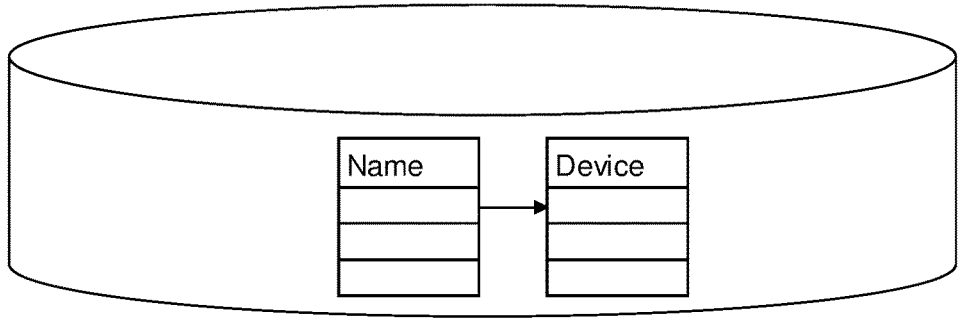

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Reference will now be made in detail to the embodiments of the present invention, examples of which are illustrated in the accompanying drawings, wherein like reference numerals refer to like elements throughout.

Referring to FIG. 1A, data warehouse system 1 includes a extract transform load (ETL) system 2 and a data warehouse 4. ETL system 2 includes an ETL model 3, sources systems 6A to 6N, a staging area 7; and operational data (inside name device table, but not shown). ETL model 3 includes all the metadata within ETL system 2 and is represented by a table with at least two columns, such that the table includes at least a name column and a device column.

Operational data coming from source systems 6A to 6N into data warehouse 4 is often (but not always) loaded (using ETL transform 8) into staging area 7, in order to perform data validation and data quality checks, before loading (using ETL transform 9) into data warehouse 4. The data structure of staging area 7 often (but not always) closely follows the structure of source systems 6A to 6N in order to avoid complex transformations during the source to staging data load process. However, in this example a staging area model is represented in the FIG. 1A by two related tables, such that, the staging area model includes a table with a single name column and a table with a single device column. In addition, staging area 7 usually has minimal data constraints, so that data is not rejected at this early stage of the data load process.

Data warehouse 4 is a structured environment with normalized tables, constraints, consistent data types and referential integrity. Data warehouse 4 includes data warehouse model 5 represented in FIG. 1A by two related tables, such that, warehouse model 5 includes a table with a single name column and a table with a single device column.

Source systems 6A to 6N are data sources that an organization uses to create and maintain data to run a business, for example, a device data logging system, an order to cash system or a customer relationship management system. Staging area 7 is an intermediate storage area used to consolidate and organize the operational data in advance of it being loaded to data warehouse 4. ETL transform 8 (source to staging area transform) extracts operational data from source systems 6A to 6N and loads it into staging area 7.

Data warehouse 4 is a central repository of integrated data from one or more source systems 6A to 6N. Data warehouse 4 is typically used to perform data analysis & reporting across an enterprise. ETL transform 9 (staging area to data warehouse transform) extracts operational data from staging area 7, transforms the data and loads the data into data warehouse 4.

Figure 1B:
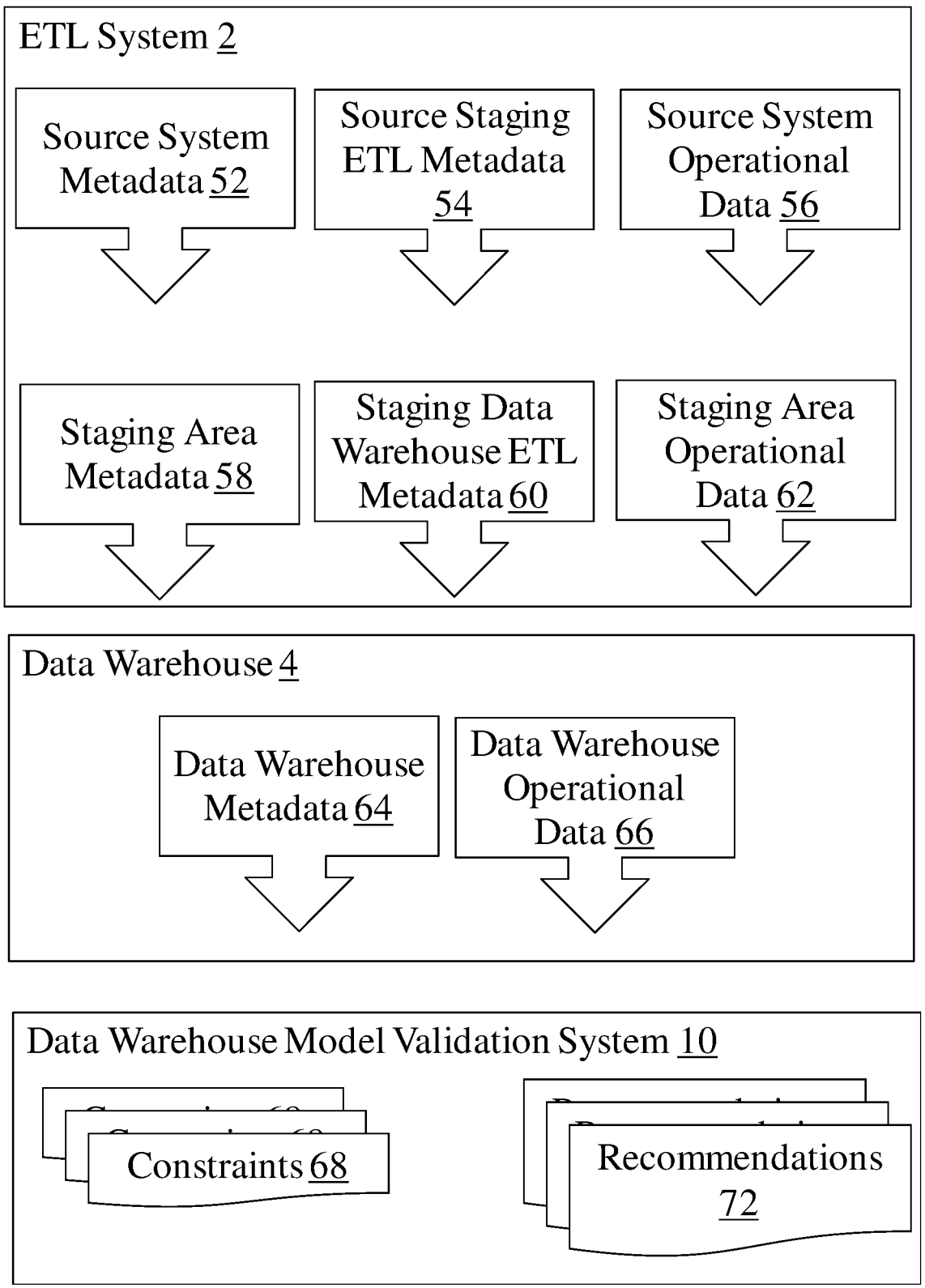
FIG. 1B is a data diagram of an example data warehouse ETL system, in accordance with an embodiment of the present invention.

Referring to FIG. 1B, ETL system 2, data warehouse 4 and data warehouse model valiadation system 10 use metadata and operational data to validate both the design and completeness of the data warehouse model and to suggest improvements. This eliminates the need for time consuming manual analysis, which is error prone, across a wide range of source systems 6A to 6N. ETL system 2 includes a source system metadata 52, a source staging ETL metadata 54, a source system operational data 56, a staging area metadata 58, a staging data warehouse ETL metadata 60, and a staging area operational data 62. Data warehouse 4 includes a data warehouse metadata 64, and a data warehouse operational data 66. Data warehouse model validation system 10 uses constraints 68 (also known as recommendation rules) to guide data warehouse 4 to make recommendations 72 to improve the data warehouse model 5.

Source system metadata 52 comprises metadata related to the source system data model, including table and column names & definitions, relationships, data types, primary key constraints and foreign key constraints, and not null constraints. Source to staging ETL metadata 54 comprises metadata related to the source-to-staging ETL jobs, including source and target data elements, transformation rules, as well as operational metadata on when the job was last run, and how many rows were processed.

Source systems 6A to 6N operational data 56 comprises detailed operational data, from the source system 6A to 6N, used to run the operations of the business. Staging area metadata 58 includes metadata related to the staging area data model, including a table and column names and definitions, relationships, data types, primary key constraints and foreign key constraints, and not null constraints. Staging area to data warehouse ETL metadata 60 includes metadata related to the staging-to-warehouse ETL jobs, including a source and target data elements, transformation rules, as well as operational metadata on when the job was last run and how many rows were processed. Staging area operational data 62 includes detailed operational data, from the staging area.

Data warehouse metadata 64 includes metadata related to the target data warehouse model, including table and column names & definitions, relationships, data types, primary key constraints and foreign key constraints, and not null constraints. Data warehouse operational data 66 includes detailed operational data stored in the data warehouse.

Figure 1C:
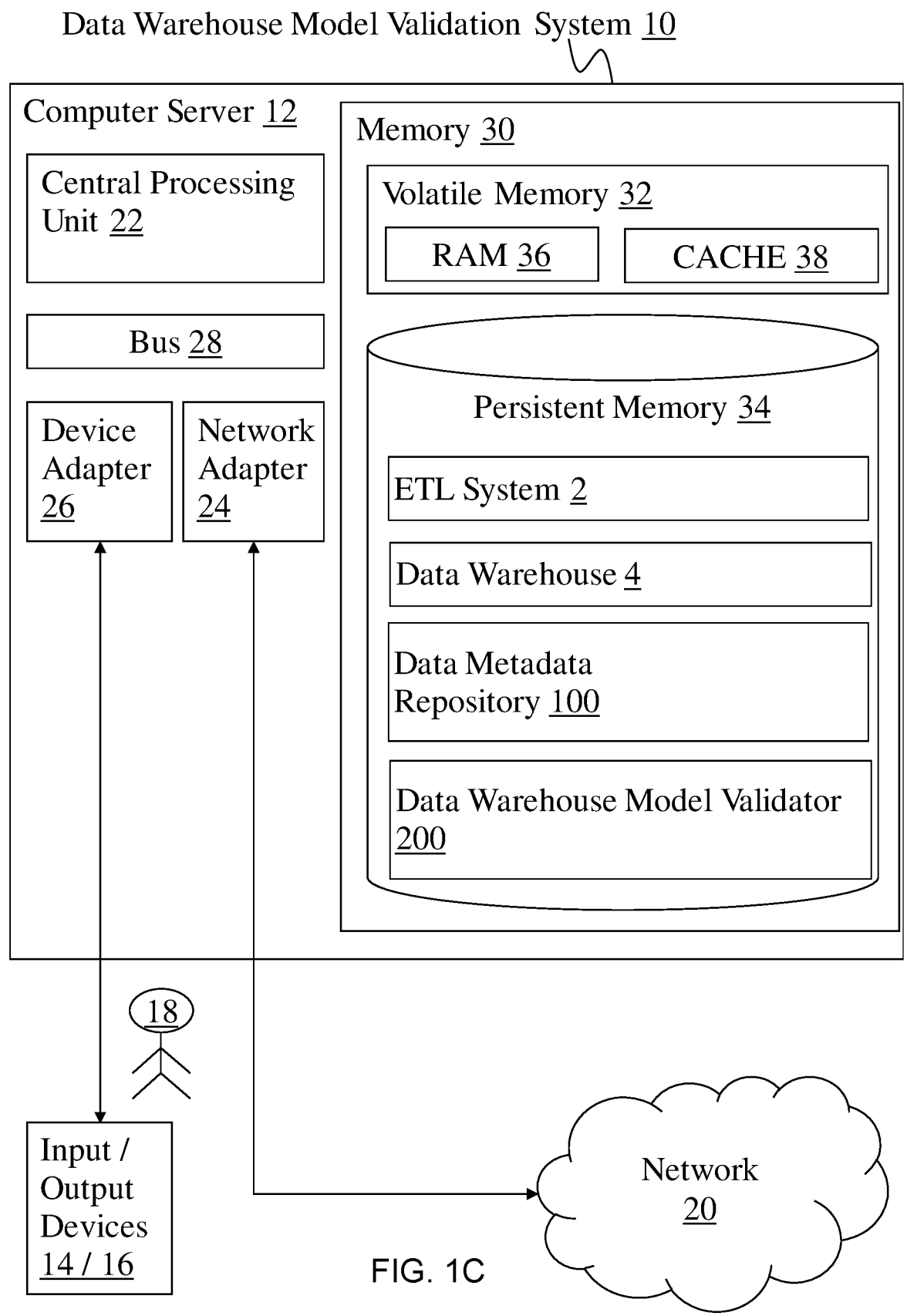
FIG. 1C is a deployment diagram of a data warehouse model validation system, in accordance with an embodiment of the present invention.

Referring to FIG. 1C, the data warehouse model validation system 10 is operational with numerous other general purpose or special purpose computing system environments or configurations. Examples of computing processing systems, environments, and/or configurations that may be suitable for use with data warehouse model validation system 10 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed computing environments that include any of the above systems or devices. A distributed computer environment includes a cloud computing environment for example where a computer processing system is a third party service performed by one or more of a plurality computer processing systems. A distributed computer environment also includes an Internet of things computing environment, for example, where computer processing systems are distributed as a network of objects that can interact with a computing service.

Data warehouse model validation system 10 may be described in the general context of computer system executable instructions, such as program modules, being executed by a computer processor. Generally, program modules may include: routines; programs; objects; components; logic; and data structures that perform particular tasks or implement particular abstract data types. Data warehouse model validation system 10 may be embodied in distributed cloud computing environments where tasks are performed by remote processing devices that are linked through a communications network. In a distributed cloud computing environment, program modules may be located in both local and remote computer system storage media including memory storage devices.

Data warehouse model validation system 10 comprises: general purpose computer server 12 and one or more input devices 14 and output devices 16 directly attached to the computer server 12. Data warehouse model validation system 10 is connected to a network 20. Data warehouse model validation system 10 communicates with a user 18 using input devices 14 and output devices 16. Input devices 14 include one or more of: a keyboard; a scanner; and a mouse, trackball or another pointing device. Output devices 16 include one or more of a display or a printer. Data warehouse model validation system 10 communicates with network devices (not shown) over network 20. Network 20 can be a local area network (LAN), a wide area network (WAN), or the Internet.

Computer server 12 comprises: central processing unit (CPU) 22; network adapter 24; device adapter 26; bus 28 and memory 30.

CPU 22 loads machine instructions from memory 30 and performs machine operations in response to the instructions. Such machine operations include: incrementing or decrementing a value in a register; transferring a value from memory 30 to a register or vice versa; branching to a different location in memory if a condition is true or false (also known as a conditional branch instruction); and adding or subtracting the values in two different registers and loading the result in another register. A typical CPU can perform many different machine operations. A set of machine instructions is called a machine code program, the machine instructions are written in a machine code language which is preferred to a low level language. A computer program written in a high level language needs to be compiled to a machine code program before it can be run. Alternatively a machine code program such as a virtual machine or an interpreter can interpret a high level language in terms of machine operations.

Network adapter 24 is for enabling communication between the computer server 12 and network devices.

Device adapter 26 is for enabling communication between computer server 12 and input devices 14 and output devices 16.

Bus 28 couples the main system components together including memory 30 to CPU 22. Bus 28 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Memory 30 includes computer system readable media in the form of volatile memory 32 and non-volatile or persistent memory 34. Examples of volatile memory 32 are random access memory (RAM) 36 and cache memory 38. Examples of persistent memory 34 are read only memory (ROM) and erasable programmable read only memory (EPROM). Generally volatile memory is used because it is faster and generally non-volatile memory is used because it will hold the data for longer. Data warehouse model validation system 10 may further include other removable and/or non-removable, volatile and/or non-volatile computer system storage media. By way of example only, persistent memory 34 can be provided for reading from and writing to a non-removable, non-volatile magnetic media (not shown and typically a magnetic hard disk or solid-state drive). Although not shown, further storage media may be provided including: an external port for removable, non-volatile solid-state memory; and an optical disk drive for reading from or writing to a removable, non-volatile optical disk such as a compact disk (CD), digital video disk (DVD) or Blu-ray. In such instances, each can be connected to bus 28 by one or more data media interfaces. As will be further depicted and described below, memory 30 includes a program product having at least one module that is configured to carry out the functions of embodiments of the invention.

Modules configured to carry out the functions of the preferred embodiment comprise: ETL system 2, data warehouse system 4, data metadata repository 100 and data warehouse model validator 200. In the preferred embodiment the modules are loaded from the persistent memory 34, where they are stored, into volatile memory 32 for operation. In another embodiment, ROM in memory 30 stores the modules for enabling the computer server 12 to function as a special purpose computer specific to a data warehouse model validator system. Further program modules that support the preferred embodiment but are not shown include firmware, boot strap program, operating system, and support applications. Each of the operating system; support applications; other program modules; and program data; or some combination thereof; may include an implementation of a networking environment.

ETL system 2 provides ETL functionality. Data warehouse 4 provides data warehouse functionality. Data metadata repository 100 provides the memory structure for storing data metadata for the source systems, ETL system 2 and data warehouse 4.

Data warehouse model validator 200 provides data warehouse model validator functionality and communicates with at least one network 20 (such as a local area network (LAN), a general wide area network (WAN), and/or a public network like the Internet) via network adapter 24. Network adapter 24 communicates with the other components of computer server 12 via bus 28. It should be understood that although not shown, other hardware and/or software components could be used in conjunction with data warehouse model validation system 10. Examples, include, but are not limited to: microcode, device drivers, redundant processing units, external disk drive arrays, redundant array of independent disks (RAID), tape drives, and data archival storage systems.

Referring to FIG. 2, data warehouse model validator 200 includes the following components, a element group locator 202, an inconsistency determiner 204, an inconsistency recorder 206, a validator 208, a recommender 210, a fixing engine 212, a prioritization engine 214, and a data warehouse model validator method 300.

Element group locator 202 is for locating an element group across the ETL model and the data warehouse model, whereby the element group comprises ETL elements and related data warehouse elements.

Inconsistency determiner 204 is for determining inconsistencies between the ETL elements and data warehouse elements, whereby one or more elements are missing from the data warehouse model or one or more elements in the data warehouse model do not correspond to expected elements. Extra elements in the data warehouse model that are not in the ETL model are unexpected elements. The preferred embodiment is also for determining inconsistencies between sub-element of elements whereby an element can be a table and a sub-element would be the columns in the table. In the description, functions relating to elements will also relate to sub-elements such that sub-elements are treated as elements.

Inconsistency recorder 206 is for recording any located missing elements or unexpected elements from the located element group.

Validator 208 is validating the data warehouse model for the located element group if there is nothing unexpected in or nothing missing from the element group.

Recommender 210 is for recommending an improvement to fix the missing elements or unexpected elements in the element group of the data warehouse model or ETL model if there are missing elements or unexpected elements in the element group.

Fixing engine 212 is for effecting improvements with respect to the missing elements or unexpected elements in the element group of the data warehouse model or ETL model if there are missing elements or unexpected elements in the element group.

Prioritization engine 214 is for prioritizing two or more element groups based on the number of differences between corresponding elements in each element group.

Figure 3C:
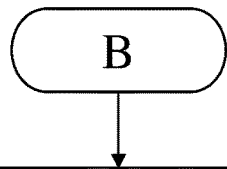
Figure 3C:
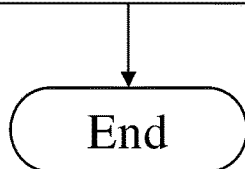

Referring to FIGS. 3A, 3B and 3C, data warehouse model validator method 300 controls the process of the preferred embodiment and includes logical process steps 302 to 318. Although there is an order to the preferred embodiment steps as described, the steps may not necessarily need to be in this order unless specified and in other embodiments steps can be in a different order.

Data warehouse model validator method 300 starts by locating an element group across the ETL model (including source system data models and ETL staging data models) and data warehouse model 5, whereby the element group comprises at least one ETL element and optionally one or more data warehouse elements that have a mapping relationship (elements include data model elements, ETL staging instructions and operational data) (304).

Data warehouse model validator method 300 determines inconsistencies between the ETL elements and data warehouse elements, whereby one or more elements are missing from the data warehouse model or one or more elements in the data warehouse model do not correspond to expected elements (306).

Data warehouse model validator method 300 records any located missing elements or unexpected elements from the located element group (308).

Referring to FIG. 3B, Data warehouse model validator method 300 validates the data warehouse model for the located element group if there is no unexpected element in or no expected element missing from the element group (310). Step 310 is, optionally, further for validating the data warehouse model for all the located element groups if there is no unexpected element in or no expected element missing from all the located element groups.

Data warehouse model validator method 300 recommends an improvement to fix the missing elements or unexpected elements in the element group of the data warehouse model or ETL model if there are missing elements or unexpected elements in the element group (312).

Data warehouse model validator method 300 effects improvements on the missing elements or unexpected elements in the element group of the data warehouse model or ETL model if there are missing elements or unexpected elements in the element group (314).

Referring to FIG. 3C, in the case where two or more element groups are located and respective recommendations determined, data warehouse model validator method 300 prioritizes the recommendations based on the number of differences between the respective element groups (316). The number of differences is assumed to be related to design effort input to the ETL model and data warehouse model 5. The described embodiments use the number of differences as examples but in other embodiments these may be less important than the type of differences and other factors may be taken into account.

In another example, the number of differences between the element composition including differences between sub-elements of the elements are counted. In another example, any new elements are counted as differences.

Figure 4A:
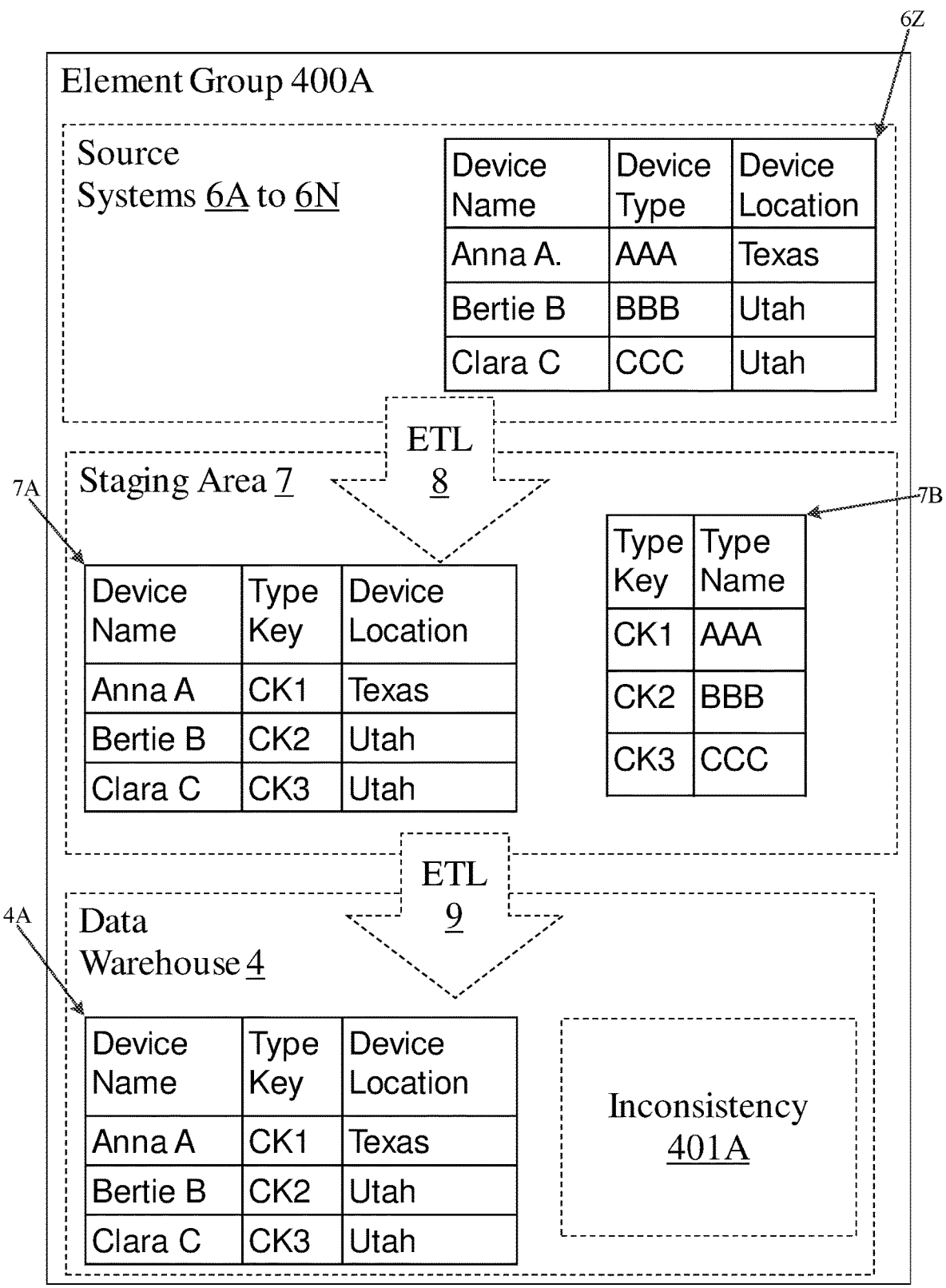
FIGS. 4A to 4D are example validation states for embodiment rules of the data warehouse ETL system.
Figure 4B:
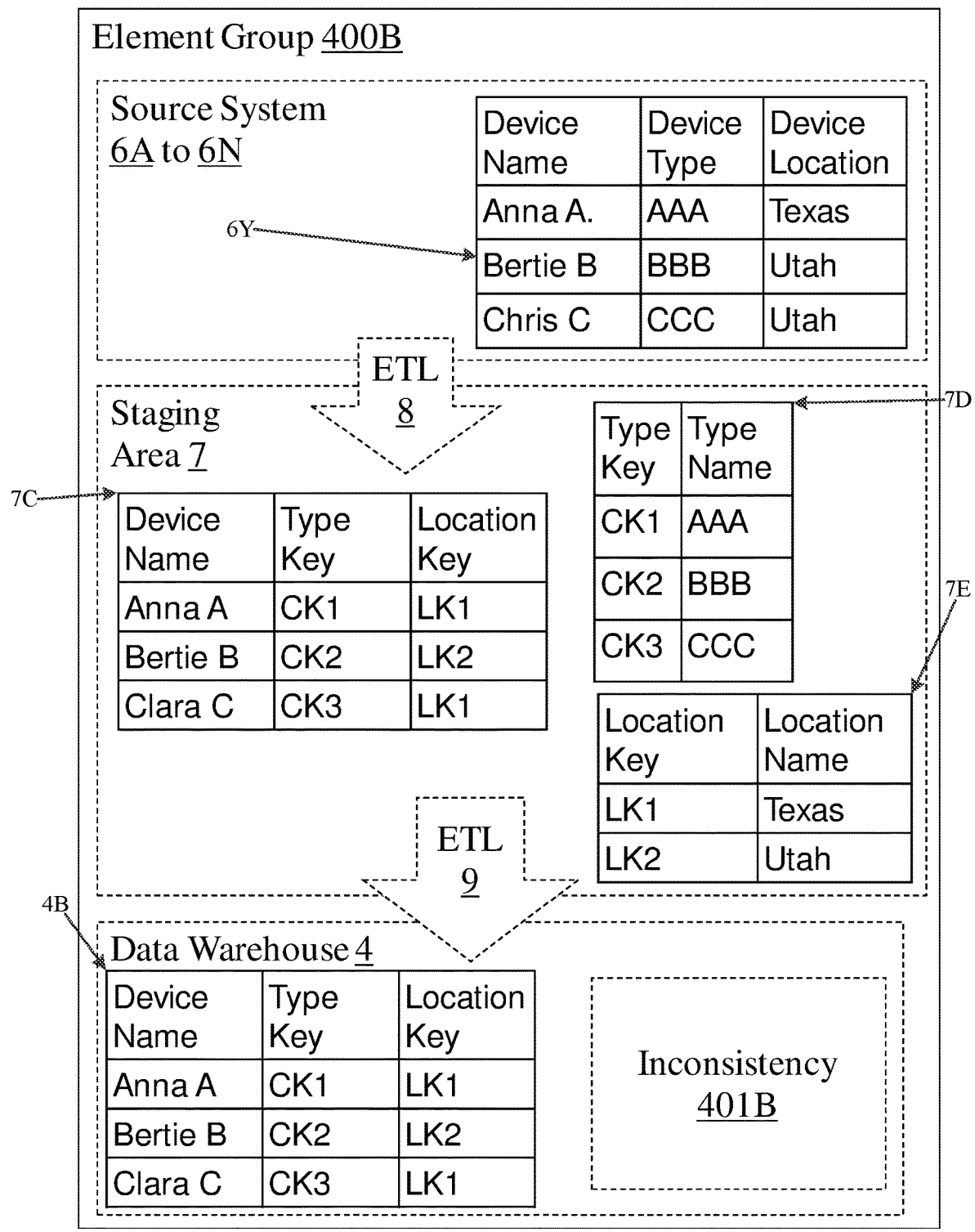
Figure 4C:
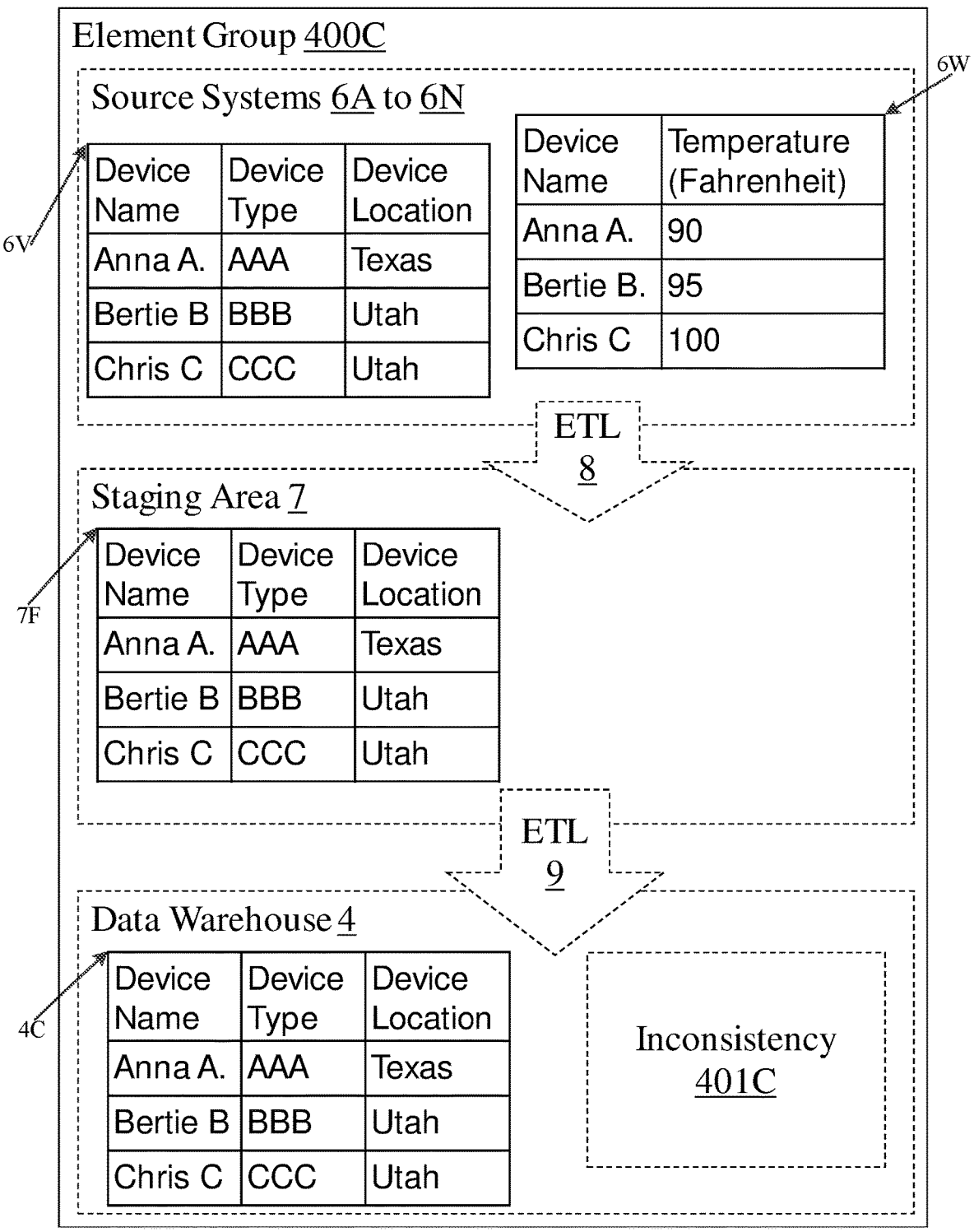

FIG. 4A to 4C are examples of the preferred embodiment are described.

In the examples, a data warehouse team is responsible for maintaining an enterprise data warehouse model 5, and managing the operations of the warehouse including loading the warehouse with data, and ensuring the consistency of the data. The data warehouse 4 is fed data from a large number of source systems 6A to 6N. Events have resulted in many new data sources with large volumes of data being integrated into the warehouse; advances in smart metering and diagnostic device technology have resulted in large volumes of device data being integrated into the data warehouse 4.

The device data is very high volume and contains much redundant data. For example, the device serial number, device status and manufactured date are contained on each meter reading submitted by five million data sources taken at fifteen minute intervals. There are many other devices feeding similar data to the warehouse. The data warehouse team need to manually analyze the operational device data to discover redundant data and then apply changes to the data warehouse model 5 to normalize the data structures.

One of the databases does not enforce primary key, foreign key constraints, or mandatory/optional constraints. Data is considered of low quality by analysts, expected fields are blank and joins often fail, because of inconsistencies in historical data that due to the lack of database constraints. The data modeler needs to analyze operational data inconsistencies manually to discover issues. Additional constraints are then manually applied to the data warehouse model to eliminate the possibility of these issues happening. This is time consuming and error prone.

Referring to FIG. 4A, according to a preferred embodiment the recommendation rule that counts the number of differences is illustrated in terms of different numbers of tables between the source system and the staging area. Source systems 6A to 6N contain a single table 6Z with three columns (device name; device type; and device location). An initial transformation into staging area 7 creates two separate tables (7A and 7B) and a type foreign key. Elements in element group 400A are discovered. An inconsistency 401A is located when device type name metadata is expected because it exists in source systems and staging area but not found in data warehouse 4. Data warehouse 4 only contains a three column table 4A for name and location but there is no corresponding table (or other metadata) for type name. The importance of this inconsistency is rated using the recommendation rule that counts the differences between the element metadata in ETL system 2 and in this example the difference is two tables versus a single table showing that significant effort has been make in the ETL process but not carried through into the data warehouse 4. This is just an example and the number of differences may be less important than the type of differences. In the preferred embodiment only important types of difference are considered such as data structure but other factors may be taken into account.

Referring to FIG. 4B, the recommendation rule that counts the number of differences is again illustrated but this time according to another embodiment in which the recommendation rule is counting different keys. Source systems 6A to 6N contain a single table 6Y with three columns (device name; device type; and device location). Initial transformation into staging area 7 creates three separate tables (7C, 7D, and 7E) and two new foreign key. Elements in element group 400B are discovered and an inconsistency 401B is located because there is device type name metadata and device location name metadata in staging area 7 and therefore expected to be located within warehouse 4, but are not found. Data warehouse 4 only contains a three column table 4B with no type name metadata or location name metadata (or in fact not any type name data or location name data)). The importance of this inconsistency is rated using the recommendation rule that counts the differences between the element metadata in ETL system 2 and in this example the difference is two new keys showing that significant effort has been make in the ETL process but not carried through into the data warehouse. This example could have also counted number of new tables or both tables and new keys. In each case, the example in FIG. 4B has two differences, one more than the example in FIG. 4A and so the example of FIG. 4B would be prioritized over the FIG. 4A example for recommendations and fixing. In FIG. 4B, the recommendation would be to add both device type and device location metadata to the data warehouse and to look at ETL process 9 for potential errors. In FIG. 4A, the recommendation would be to add device type to the data warehouse and to look at ETL process 9 for potential errors.

Referring to FIG. 4C, a recommendation rule that counts the number of new elements according to yet another embodiment is illustrated. Source systems 6A to 6N contain two tables 6V and 6W. The first is an existing table 6V with three columns (device name; device type; and device location) that is consistent in ETL system 2 (that, has properly transferred to the staging area 7). The second table 6W (device name; and device temperature) is related to the existing table with two columns representing device name and device temperature. It is this new related table 6W that is not consistent and has resulted in the discovery of inconsistency 401C in data warehouse 4 because it was expected but not located. Initial transformation into staging area 7 only creates the existing table 7F as does the next transformation into data warehouse 4. The importance of this inconsistency is rated lower than the examples in FIGS. 4A and 4B because there is only one occurrence of a single new related table showing that no effort has been made to carry this element through the ETL process into the data warehouse. Potentially such an inconsistency is intentional.

Figure 4D:
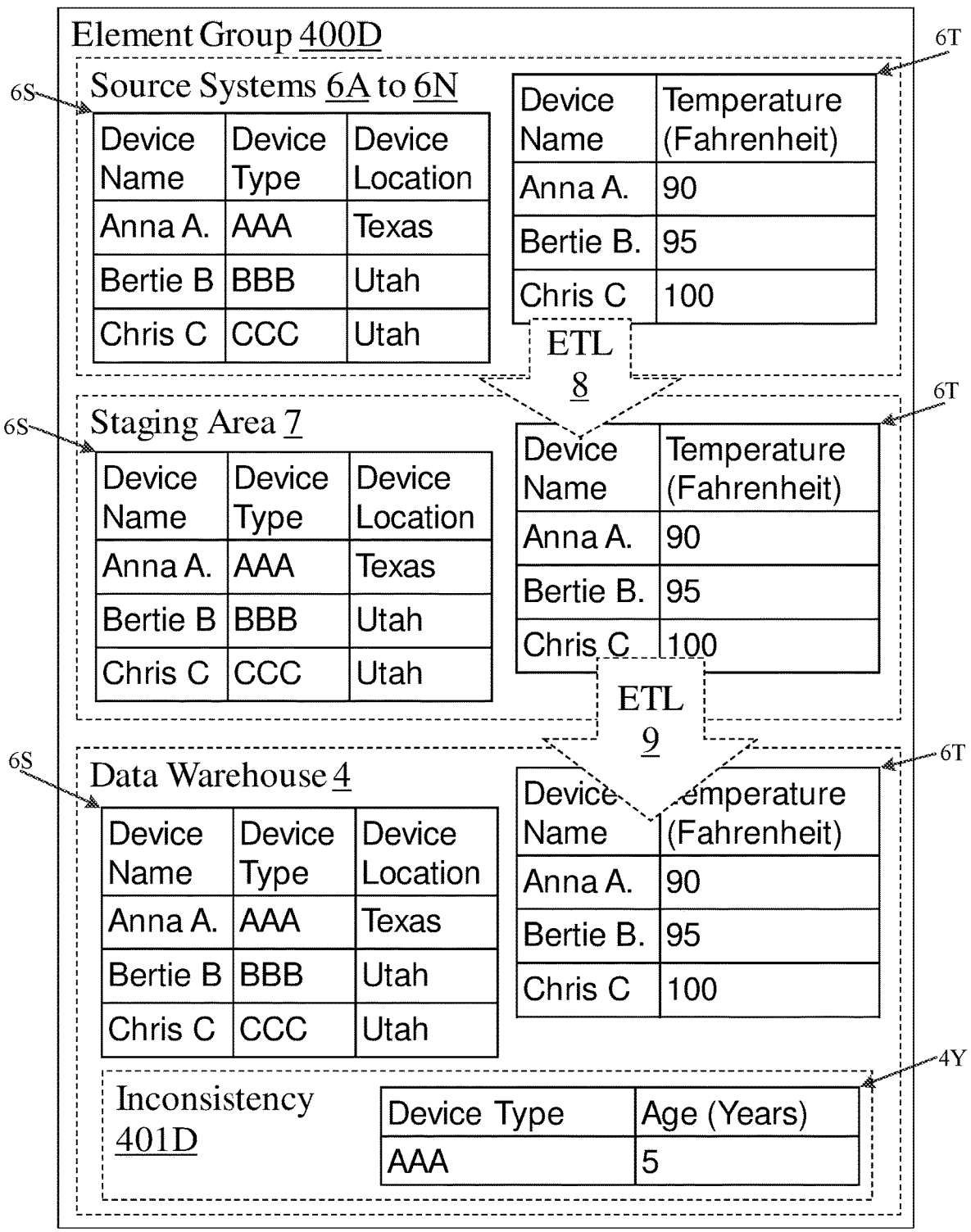

Referring to FIG. 4D, a recommendation rule that counts the number of new elements according to yet another embodiment is illustrated. Source systems 6A to 6N contain two tables 6S and 6T. The first table 6S is an existing table with three columns (device name; device type; and device location) that is consistent in ETL system 2 (that has properly transferred to the staging area 7). The second table 6T is related to the first table with two columns representing device name and device temperature. The first and second tables 6S and 6T are included in the source system 6A to 6N, the staging area 7, and in data warehouse 4. But in data warehouse 4 there exists a further related table 4Y containing a column with device age in years. This device age table 4Y is not expected because there is no previous device age element in the element group 400D. It is this new related table 4Y that is not consistent and has resulted in the discovery of inconsistency 401D in data warehouse 4 because it was unexpected and located. The priority of this inconsistency is lower than the examples in FIGS. 4A and 4B because potentially such an inconsistency is intentional.

Further embodiments of the invention are now described. It will be clear to one of ordinary skill in the art that all or part of the logical process steps of the preferred embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of the preferred embodiment may be alternatively embodied in logic apparatus comprising logic elements to perform the steps of the method, and that such logic elements may comprise components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention may be realized in the form of a computer implemented method of deploying a service comprising steps of deploying computer program code operable to, when deployed into a computer infrastructure and executed thereon, cause the computer system to perform all the steps of the method.

It will be appreciated that the method and components of the preferred embodiment may alternatively be embodied fully or partially in a parallel computing system comprising two or more processors for executing parallel software.

A further embodiment of the invention is a computer program product defined in terms of a system and method. The computer program product may include a computer-readable storage medium (or media) having computer-readable program instructions thereon for causing a processor to carry out aspects of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed. However, numerous modifications and substitutions can be made without deviating from the scope of the present invention. Therefore, the present invention has been disclosed by way of example and not limitation.

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A method for a data warehouse model validation system having an extract transform load (ETL) model and a corresponding data warehouse model, the method comprising:
   locating at least two element groups across an ETL model of an ETL system and a data warehouse model of a data warehouse, wherein the at least two element groups comprise ETL elements and related data warehouse elements;
   determining, for the located at least two element groups, inconsistencies between ETL elements of the ETL system and related data warehouse elements of the data warehouse, wherein the inconsistencies include: an ETL element in a staging area of the ETL system being missing from the data warehouse, an ETL element in a source system being missing from the staging area of the ETL system or the data warehouse, or a related data warehouse element from the located at least two element groups being missing from the staging area of the ETL system or the source system;
   recording a missing ETL element or a related data warehouse element from the located at least two element groups;
   determining respective recommendations for an improvement for the located at least two element groups; and
   prioritizing the recommendations for an improvement for the located at least two element groups.

2. The method according to claim 1, further comprising validating the data warehouse model for the located at least two element groups when there is nothing missing from the at least two element groups.

3. The method according to claim 1, wherein the determining respective recommendations for an improvement for the located at least two element groups further comprises recommending an improvement to fix the ETL element in a staging area of the ETL system that is missing from the data warehouse, to fix the ETL element in a source system that is missing from the staging area of the ETL system or the data warehouse, or fix the related data warehouse element from the located at least two element groups that is missing from the staging area of the ETL system or the source system, or the ETL model when there are missing ETL elements or related data warehouse elements in the at least two element groups.

4. The method according to claim 1, further comprising effecting improvements in the ETL elements the ETL element in a staging area of the ETL system that is missing from the data warehouse, the ETL element in a source system that is missing from the staging area of the ETL system or the data warehouse, the related data warehouse element from the located at least two element groups that is missing from the staging area of the ETL system or the source system, or the ETL model when there are missing ETL elements or related data warehouse elements in the at least two element groups.

5. The method according to claim 1, wherein the prioritizing the at least two element groups is based on a number of differences between each of the two or more element groups.

6. The method according to claim 1, wherein a number of the ETL elements or the related data warehouse elements in one of the at least two element groups are counted as differences.

7. The method according to claim 1, wherein a number of differences between each two or more element groups includes differences between sub-elements of the ETL elements or the related data warehouse elements.

8. The method according to claim 1, wherein the ETL model comprises:

a source system data models; and a ETL staging data models.

9. The method according to claim 1, wherein the ETL elements or the related data warehouse elements of the at least two element groups include data model elements and operational data.

10. The method according to claim 1, wherein the ETL elements or the related data warehouse elements of the at least two element groups further include ETL staging instructions.

* * * * *